United States Patent Office 3,796,810
Patented Mar. 12, 1974

3,796,810
BAKERY PRODUCTS WITH A NON-HYDRO-PHILIC AGENT, POLYPROPYLENE GLYCOL
John R. Moneymaker, Overland Park, Kans., and Curtis J. Forsythe, Raytown, Mo., assignors to Top-Scor Products, Inc., Kansas City, Kans.
No Drawing. Filed Mar. 3, 1972, Ser. No. 231,713
Int. Cl. A21d 2/14
U.S. Cl. 426—19    7 Claims

ABSTRACT OF THE DISCLOSURE

Yeast-raised bakery products show improvements in various desirable characteristics upon the incorporation into the dough of polypropylene glycol having an average molecular weight of about 1000 to about 5000. This is a departure from traditional bakery product additives which heretofore have been classified broadly as "lipid type" in that the polypropylene glycols are predominately hydrophobic, while lipid type additives contain both a functional hydrophilic and a functional hydrophobic moiety.

---

This invention relates to the production of yeast-raised bakery products and more particularly to improvements therein due to the incorporation of formula additives.

In the preparation of baked goods, particularly pan breads, various lipid type additives are commonly used to retard apparent staling through amylose complexing and improve dough handling properties, product volume, texture and internal grain. Several of these commonly employed additives also compensate to some extent for variations in the quality and composition of flour as well as processing variables which are difficult to control in modern production methods. Presently recognized lipid type additives include mono and diglycerides, distilled monoglycerides, diacetyl tartaric acid esters of monoglycerides, propylene glycol monoesters of edible fatty acids, polyoxyethylene 20 sorbitan monostearate, polyoxyethylene 20 monodiglycerides, calcium stearyl-2 lactylate, lactylic stearate, sodium stearyl fumarate, succinylated monoglycerides and sodium stearyl-2 lactylate. All these materials are in a sense derivatives of fatty acids or fatty alcohol and contain both a functional hydrophilic and functional hydrophobic moiety.

The basis for this invention lies in the discovery that essentially water-insoluble polypropylene glycols, varying in molecular weight from about 1000 to about 5000, are very effective additives and conditioners for yeast raised baked goods without addition of polyoxyethylene or any other hydrophilic groups. In addition to providing softness and quality improving effects in the finished baked goods, such polypropylene glycols have been found to provide surprising dough strengthening effects resulting in unusual gas retention properties, whereby a baked product dough exhibits rapid proof and resists damage in processing through modern high speed equipment.

Another advantage observed in the practice of this invention is that the finished baked products exhibit exceptional crumb resiliency while remaining soft. This causes alteration of the widely observed gummy or dough-like character of white pan bread to a more pleasing spongy structure also adapted to resist damage in normal distribution.

Functional usage levels of the noted polypropylene glycols range from about 0.012% to about 0.5% by weight based on formula flour, however, due to an inherent bitter taste, usage of the lower molecular weight members of the series (less than about 2000) is limited to the lower range. Polypropylene glycols having an average molecular weight of less than about 800–900 are water soluble and appear to be ineffective for the practice of this invention.

The effective polymers may be prepared by adding propylene oxide to the two hydroxyl groups of a propylene glycol nucleus. As is well understood, this method is suitable to prepare polypropylene glycols of an average molecular weight of up to about 5000, using sodium hydroxide as catalyst. Higher molecular weight polymers are more difficult to produce in good yield and are, therefore, not readily available in commerce, although by all indications they are active agents for the practice of this invention.

It has been found that relatively pure products of 4000 to 5000 average molecular weight, since they exhibit less tendency to adversely affect flavor in the baked product, are preferred agents. Because very low levels of low molecular weight polymers, which may be present as residues, are quite active in producing objectionable flavor, removal is desirable. This may be accomplished by fractional distillation under high vacuum. For example, 3910 average molecular weight polypropylene glycol was distilled using a thin film rotary still under 20 microns pressure at 270° C., resulting in the removal of about 0.4% by weight of a polypropylene glycol fraction containing polymers having molecular weights of about 1000 or less.

The following examples illustrate the practice of this invention:

EXAMPLE I

Demonstration of improving effects

Four commercially available polypropylene glycols having molecular weights of about 1000, 2000, 4000, and 4700 were evaluated. They were respectively: Union Carbide Niax Polyol 1025, lot #S142584; Union Carbide Niax Polyol 2025, lot #S143480; Dow Chemical Polyglycol P–4000, lot TB12170–926; and Mazer Chemical Mazon 47P, lot #1613. These agents are characterized as follows:

TABLE I

| Additive | Acid # | Percent water | Hydroxyl # | Average molecular weight |
|---|---|---|---|---|
| Niax 1025 | 0.03 | 0.01 | 113.4 | 989.5 |
| Niax 2025 | 0.03 | 0.01 | 57.4 | 1,955.0 |
| P–4000 | 0.05 | 0.02 | 28.7 | 3,910.0 |
| Mazon 47P | 0.10 | 0.05 | 23.9 | 4,695.0 |

These agents were included in a standard commercial white bread formula at various levels based upon total formula flour weight. A conventional sponge dough preparation was employed and the agents were introduced with the dough ingredients. The bread formula follows:

Sponge side:                          Parts by wt.
   Patent flour (14% moisture basis) _____ 455
   Bakers yeast _____ 17.5
   Arkady yeast food _____ 2.8
   Water _____ 300

Dough side:                           Parts by wt.
   Patent flour (14% moisture basis) _____ 245
   Sucrose _____ 28
   Cerelose _____ 28
   High heat nonfat milk solids _____ 14
   Salt _____ 14
   Lard _____ 17.5
   Water (total absorption 67.5%) _____ 172.5

The sponge ingredients were mixed at 80° F. in a jacketed McDuffy bowl with an A–120 Hobart mixer and dough fork for one minute at #1 and #2 speeds respectively. The sponges were fermented four hours, then remixed with the dough ingredients for one minute at #1 speed and seven minutes at #2 speed. The mixed doughs were given a 35 minute floor time, then divided and scaled at 18.5 oz. After a twelve minute overhead, the doughs were molded, panned, proofed to 0.5 inch above the pan tops, and baked for twenty minutes at 423° F. in a Fisher reel oven.

Each test was performed in duplicate, and control doughs containing no additives were included for comparison. Following baking in one-pound units, the loaves were allowed to cool, then stored in polyethylene bags for twenty-four hours.

Loaf volume was measured by rape seed displacement, and loaves were cut for internal quality evaluation using a scoring system which separately takes into account the major internal and external characteristics of the loaves. These characteristics include loaf volume, crust color, crust character, break and shred, grain, texture, crumb color, aroma, taste, and eating quality. In this scoring system each factor is considered separately and penalized according to the degree of deviation from a hypothetical perfect loaf which would score 100. An acceptable commercial loaf will receive a minimum average total score of 80, with a score of 84 or greater considered excellent. This system is based essentially on that promulgated by the American Institute of Baking and is comparable to the various methods in use throughout the baking and milling industries. Due to the extensive crumb flavor effect of the polypropylene glycols, particularly close attention was given to that aspect of loaf quality and comments were recorded. Results obtained appear in Table II.

TABLE II

| Additive | Level (percent of total flour) | Average proof time (minutes) | Average 1-lb. loaf volume (cc.) | Average total quality score | Crumb flavor observations |
|---|---|---|---|---|---|
| Control | None | 55.0 | 2,560 | 80.5 | Normal. |
| Niax 1025 (P.P.G. av. mol. wt. 989.5) | 0.05 | 50.0 | 2,612 | 82.0 | Do. |
| Do | 0.10 | 52.0 | 2,600 | 78.0 | Bitter. |
| Do | 0.20 | 51.0 | 2,675 | 75.0 | Very bitter. |
| Do | 0.40 | 51.0 | 2,850 | 74.0 | Do. |
| Niax 2025 (P.P.G. av. mol. wt. 1955) | 0.05 | 51.5 | 2,613 | 82.0 | Normal. |
| Do | 0.10 | 51.0 | 2,725 | 83.0 | Slightly bitter. |
| Do | 0.375 | 50.0 | 2,698 | 73.0 | Very bitter. |
| Polyglycol P-4000 (P.P.G. av. mol. wt. 3910) | 0.05 | 52.0 | 2,595 | 81.5 | Normal. |
| Do | 0.10 | 53.0 | 2,745 | 84.0 | Do. |
| Do | 0.25 | 53.0 | 2,757 | 85.0 | Do. |
| Do | 0.50 | 50.0 | 2,757 | 84.0 | Slightly bitter. |
| Do | 1.0 | 49.0 | 2,632 | 71.0 | Very bitter. |
| Mazon 47P (P.P.G. av. mol. wt. 4695) | 0.05 | 51.0 | 2,595 | 80.5 | Normal. |
| Do | 0.10 | 52.0 | 2,732 | 82.5 | Do. |
| Do | 0.25 | 49.0 | 2,707 | 82.0 | Slightly bitter. |
| Do | 0.50 | 51.0 | 2,807 | 83.5 | Do. |
| Do | 1.0 | 49.0 | 2,707 | 71.0 | Very bitter. |

Changes in average proof time in excess of two minutes and a loaf volume change of 100 cc. are considered significant.

These data clearly demonstrated the improving effects associated with the practice of this invention, since in each series time to proof was reduced and finished loaf volume and average total quality score improved. The increased quality scores reflected improvement in loaf volume, crumb color, softness, grain and texture. The low quality scores associated with high usage levels were primarily due to adverse product flavor effects. Usable levels appear to correlate generally with average molecular weight, the best results being associated with higher molecular weight preparations.

Polypropylene glycol with an average molecular weight of about 1000 produced a bitter taste above 0.05% based upon formula flour while the preparation of close to 2000 average molecular weight appeared usable up to about 0.10%. When the 3910 average molecular weight product was tested, a level of up to 0.25% based on flour appeared satisfactory. The Mazon 47P was more contaminated with lower molecular weight polymers than the Polyglycol P-4000 and therefore produced a bitter flavor at a lower level of usage.

EXAMPLE II

Minimum functional level

Additional baking tests were carried out to determine the minimum functional P.P.G. level. Low levels of Niax 1025 P.P.G. were used in a manner similar to that of Example I. Results follow in Table III.

TABLE III

| Additive | Level (percent of flour) | Average proof time (min.) | Average 1-lb. loaf vol. (cc.) | Average total quality score | Crumb flavor observations |
|---|---|---|---|---|---|
| Niax 1025 (P.P.G. av. mol. wt. 989.5) | 0.045 | 53.5 | 2,669 | 83.5 | Normal. |
| Do | 0.030 | 53.5 | 2,575 | 82.5 | Do. |
| Do | 0.015 | 53.5 | 2,594 | 82 | Do. |
| Do | 0.015 | 53.5 | 2,656 | 82 | Do. |
| Do | 0.012 | 54.5 | 2,624 | 81.5 | Do. |
| Do | 0.009 | 55.5 | 2,531 | 80 | Do. |
| Do | 0.006 | 56 | 2,537 | 80 | Do. |
| Control | None | 55 | 2,556 | 80 | Do. |

Surprisingly, significant functionality was demonstrated as low as 0.012% which is 120 parts per million based upon formula flour. Improvements in proof time and loaf volume appeared present, although sometimes marginal and erratic, at these lower levels, but internal grain and texture were consistently and significantly improved above 0.012%. The optimum with this additive appeared to be 0.045%.

EXAMPLE III

Further processing for improved utility

Improvement in agent utility through purification was demonstrated by using the thin film vacuum distillation technique, noted above, to remove low molecular weight residues from Polyglycol P-4000. The quantity removed was insufficient to significantly affect the product's average molecular weight. The increased purity polymer was included in the formula as described in Example I. Comparison of effect resulting from addition to the sponge and dough ingredients was carried out. Results of this evaluation are summarized in Table IV.

TABLE IV

| Additive and method of addition | Level percent of total flour | Average proof time (min.) | Average 1-lb loaf vol. (cc.) | Average total quality score | Crumb flavor observations |
|---|---|---|---|---|---|
| None (control) | | 55 | 2,560 | 80.0 | Normal. |
| P.P.G. purified (dough) | 0.25 | 52 | 2,737 | 84.5 | Do. |
| Do | 0.50 | 53 | 2,775 | 84.5 | Do. |
| Do | 1.0 | 52 | 2,675 | 77.5 | Bitter. |
| P.P.G. purified (sponge) | 0.125 | 51 | 2,710 | 85.0 | Normal. |
| Do | 0.25 | 50 | 2,735 | 84.0 | Do. |
| Do | 0.50 | 50 | 2,735 | 85.0 | Do. |

With either sponge or dough addition, the P.P.G. provided a significant reduction in the time required to accomplish loaf proof. In addition, finished product volume and total quality score were improved when the agent was introduced at levels up to about 0.5%. It was apparent that the removal of a small amount of low average molecular weight material from the original preparation made possible incorporation of higher agent levels without undesirable crumb flavor effects. This procedure demonstrated an increase in the practical level of about 0.25% as shown in Example I to about 0.5% based on formula flour.

EXAMPLE IV

Absorption tolerance

Using the purified Polyglycol P–4000 of Example III and the bread production formula and methods of Example I, the dough tolerance to variable free water introduction was determined. An absorption series test was made using 65.5, 67.5, and 69.5 parts of water for each 100 parts of flour, 0.5% purified Polyglycol P–4000 being introduced with the dough ingredients. At each absorption, controls containing no additive were also prepared for comparison. The results follow in Table V.

TABLE V

| Additive | Absorption percent of total flour | Average proof time (min.) | Average loaf volume (cc.) | Average total quality score |
|---|---|---|---|---|
| None (control) | 65.5 | 54 | 2,475 | 80.0 |
| Do | 67.5 | 55 | 2,540 | 81.0 |
| Do | 69.5 | 56 | 2,475 | 80.0 |
| Polyglycol P–4000 (purified) | 65.5 | 54 | 2,712 | 84.0 |
| Do | 67.5 | 52 | 2,737 | 84.5 |
| Do | 69.5 | 50 | 2,575 | 82.0 |

This data clearly indicated that the bread doughs containing 0.5% Polyglycol P–4000 exhibited an improved tolerance to both under absorption and over absorption when compared to the optimum absorption of 67.5% for the control doughs.

EXAMPLE V

Mixing tolerance

Using the purified Polyglycol P–4000 of Example III at 0.5% in the dough, and the bread production formula and methods of Example I, the dough tolerance to variable mixing times was determined. A series was conducted using mixing times of 5, 7, and 9 minutes respectively. At each respective mixing time a no additive control was also prepared for comparison. The results follow in Table VI.

TABLE VI

| Additive | Mixing time (min.) | Average proof time (min.) | Average loaf volume (cc.) | Average total quality score |
|---|---|---|---|---|
| None (control) | 5 | 56 | 2,587 | 80 |
| Do | 7 | 55 | 2,600 | 81 |
| Do | 9 | 56 | 2,587 | 80 |
| Polyglycol P–4000 (purified) | 5 | 49 | 2,637 | 82 |
| Do | 7 | 51 | 2,787 | 85 |
| Do | 9 | 49 | 2,700 | 84.5 |

The results indicated that when purified Polyglycol P–4000 was incorporated with the dough ingredients at 0.5% of the total flour weight, the tolerance of the resulting doughs to under and over mixing was significantly improved compared to the optimum mixing time of 7 minutes for the no additive controls.

EXAMPLE VI

Further tests showing improved characteristics

The advantageous effect of the polypropylene glycols on crumb softness with storage were demonstrated using the basic bread make up method described in Example I and the improved purity agent of Example II. Tests were carried out in triplicate and the P.P.G. was introduced at 0.5% based on formula flour with the sponge ingredients.

Following baking, loaves were allowed to cool under controlled conditions, then stored in polyethylene bags for forty-eight hours. At the end of this period loaves were cut and subjected to a laboratory standard measurement for crumb compressibility using a Universal Penetrometer. Values given for compressibility represent an average of thirty-six measurements on a total of six loaves. After completion of the compressibility, evaluation test loaves were scored as described in Example I. Results are summarized in Table VII.

TABLE VII

| Additive | Average proof time (min.) | Average loaf vol. (cc.) | Average compressibility (0.1 mm.) | Average total quality score |
|---|---|---|---|---|
| Control | 54 | 2,558 | 169 | 81 |
| P.P.G. | 51 | 2,737 | 188 | 85 |

It is indicated from the data that polypropylene glycol additive is significantly effective in retarding the apparent staling of bread.

It is to be understood that, although certain embodiments of this invention have been described, it is not to be limited thereto except insofar as such limitations are included in the following claims.

What is claimed and desired to secure by Letters Patent is:

1. In a method of producing yeast-raised bakery products which includes mixing ingredients including flour, moisture and yeast to form a dough which is subsequently proofed and baked, the improvement comprising:

mixing with said ingredients, in an amount sufficient to improve at least one characteristic taken from the group consisting of loaf volume, average total quality score, freshness retention and tolerance against adverse effects of formula and procedural variations, polypropylene glycol having an average molecular weight of about 1000 to about 5000.

2. The method as set forth in claim 1 wherein:

said polypropylene glycol is employed in an amount from about 0.012% to about 0.5% by weight based upon total formula flour.

3. The method as set forth in claim 1 wherein:

said polypropylene glycol is processed, prior to said mixing, to remove fractions containing polypropylene glycols having molecular weights of about 1000 or less.

4. The method as set forth in claim 1 wherein:

said polypropylene glycol is employed in an amount equal to about 0.045% based upon total formula flour.

5. In the manufacture of yeast-raised bakery products which includes mixing ingredients including flour, moisture and yeast to form a dough which is subsequently proofed and baked, the improvement comprising:

incorporating into the dough, prior to baking, from about 0.012% to about 0.5%, based on formula flour, of polypropylene glycol having an average molecular weight of not less than about 1000.

6. A yeast-raised bakery product dough containing:

from about 0.012% to about 0.5%, based upon formula flour, of polypropylene glycol having an average molecular weight of about 1000 to about 5000.

7. The bakery product dough as set forth in claim 6 wherein:

said polypropylene glycol is included in an amount equal to about 0.045% based on the formula flour.

References Cited

UNITED STATES PATENTS

| 3,499,917 | 3/1970 | Brandner et al. | 99—118 (R) XR |
| 3,536,497 | 10/1970 | Jackel | 99—91 |

RAYMOND N. JONES, Primary Examiner

J. R. HOFFMAN, Assistant Examiner

U.S. Cl. X.R.

426—152